Jan. 6, 1942.  E. BUCHHOLZ  2,268,694
GRINDING MACHINE
Filed July 12, 1939   2 Sheets-Sheet 2

Inventor:
ERICH BUCHHOLZ
BY Richey & Watts
ATTORNEYS.

Patented Jan. 6, 1942

2,268,694

UNITED STATES PATENT OFFICE 2,268,694

GRINDING MACHINE

Erich Buchholz, Hamburg-Vandsbek, Germany, assignor to Bauer & Schaurte, Neuss-on-Rhine, Germany, a Kommanditgesellschaft of Germany Application July 12, 1939, Serial No. 284,029
In Germany July 25, 1938

5 Claims. (Cl. 51—166)

The subject of this invention is an axial stop for grinding spindles, especially for spindles carrying discs for grinding screw threads.

As is known, in the grinding of screw threads there must, in all circumstances, be avoided axial or longitudinal shift of the grinding spindle and of the grinding disc brought about by thermal influence, in order to avoid undesired distortion of the thread. For this purpose in the known constructions there are provided abutment faces in the form of counter-stops or the like against which the grinding spindle is caused or allowed to bear, usually under the action of a spring. The known constructions are, however, open to the objection that the abutment faces are as a rule located at some distance from the grinding disc, so that under the influence of the heat set up during the grinding operation thermal expansion of the spindle beyond this distance might result in lateral shift of the disc which, for example in the grinding of fine screw threads, results in disadvantageous distortion of the thread.

In order now to exclude such influences incidental to thermal expansion, according to the invention the grinding spindle, which is freely slidable in radial bearings, bears against an axial stop located in the central plane of the profile disc. The axial stop thus coincides with the central plane of the disc, the spindle being free to expand thermally in both directions from the central plane without any influence being exercised on the longitudinal bearings.

With a horizontal arrangement the spindle may be caused to bear on the axial stop under the urge of a spring; in a suitable modification, however, the spindle may be disposed vertically and may bear on the axial stop under the action of its own weight.

Figure 1:
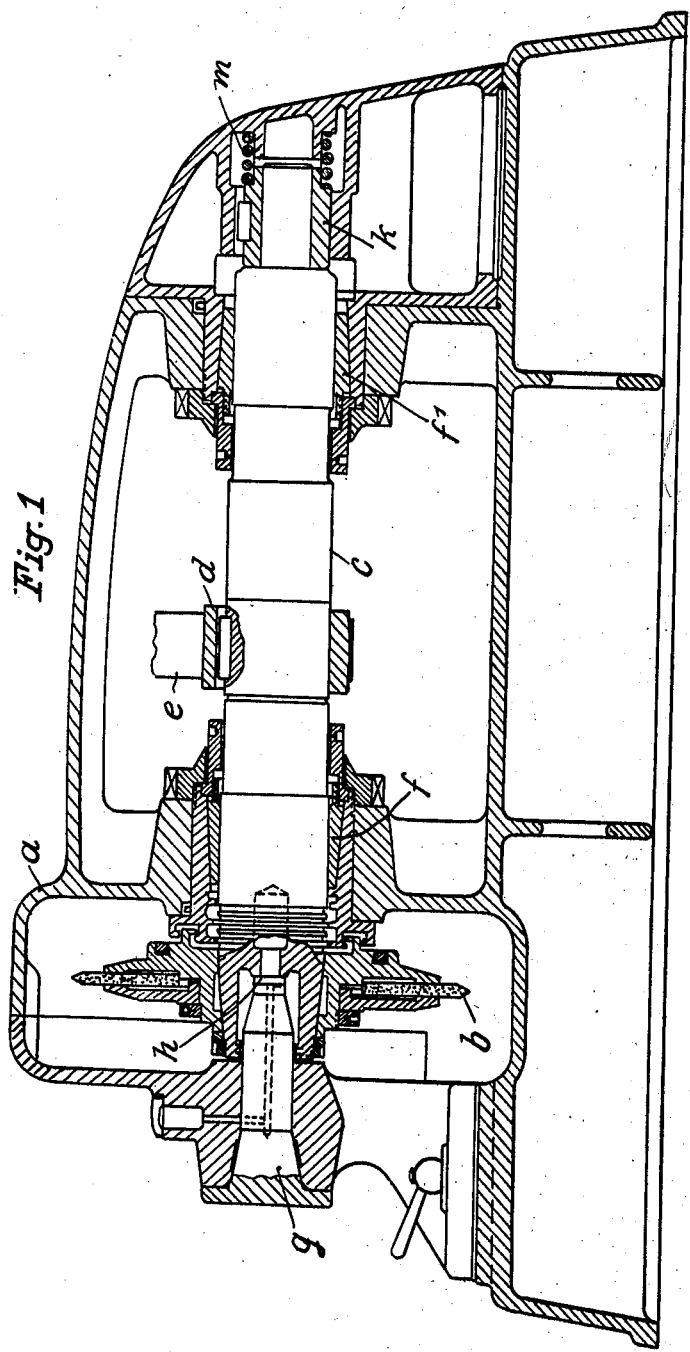
Figure 2:
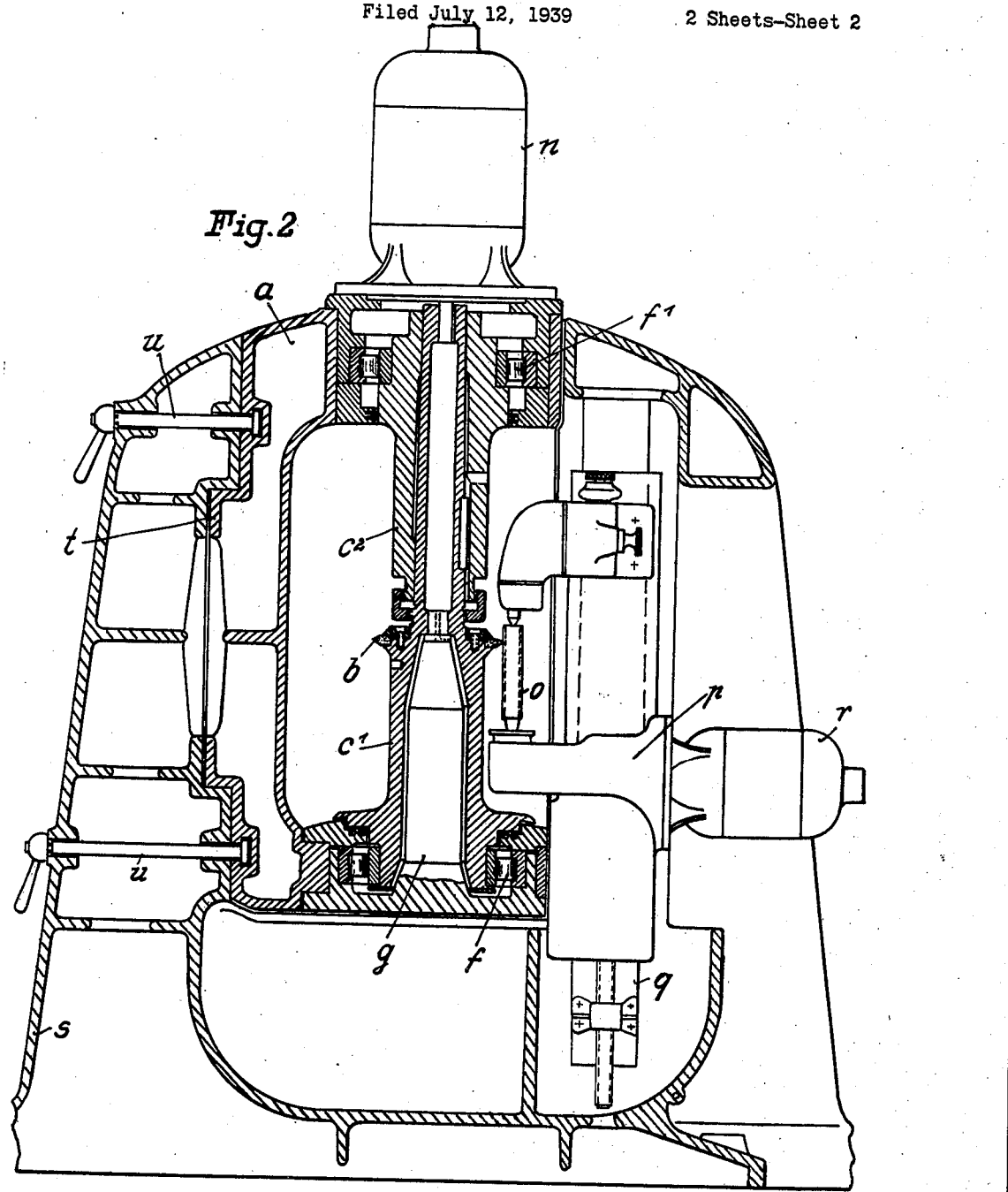

In the accompanying drawings, which illustrate two embodiments of the invention, Fig. 1 shows in section a horizontally disposed grinding spindle with an axial stop according to the invention; Fig. 2 is a central vertical section of a vertically disposed grinding spindle with an axial stop according to the invention.

In the construction according to Fig. 1, $a$ denotes the spindle casing which encloses after the manner of a hood a one-groove profile grinding disc $b$. The disc $b$ is secured on a horizontal spindle $c$ secured to which, about midway between its ends, is a belt pulley $d$ over which runs a driving belt $e$. The spindle $c$ is journalled in two radial bearings, in the present embodiment in sliding bearings $f$ and $f'$. The bearings permit a restricted axial shift of the spindle $c$ in both directions.

At the left hand end of the spindle $c$ is a holder $g$ in the form of a pin fitted horizontally into the casing $a$. The pin $g$ projects into a cavity within the adjacent end of the spindle, which cavity houses an axial stop $h$ located in the central plane of the disc $b$. At its opposite end the spindle $c$ is stepped and surrounded by an axially movable bush $k$ which is subject to the action of a spring $m$. The spring $m$ continuously urges the spindle in the direction towards the axial stop $h$. Thermal expansion has no influence on this arrangement, as the parts subjected to thermal expansion can move in both directions relatively to the opposed faces. The cooling of the axial stop $h$ is effected, for example, by leading thereto part of the coolant used in grinding.

In Fig. 2 there is illustrated a modified construction with a vertically mounted spindle for a grinding disc for screw threads. In this embodiment the spindle consists of the halves $c'$ and $c^2$ in the form of sleeves in telescopic relation. As radial bearings there serve in this case roller bearings. The actuation of the spindle is effected by a motor having a seating flange and arranged vertically above the sleeve $c^2$, the shaft of which motor engages the sleeve element $c'$. Under the action of gravity the spindle rests on the axial stop presented by the pin $g$.

In correspondence with the vertical arrangement of the spindle also the work-piece $o$ is fitted to a vertical holder $p$ which is slidable in vertical guides $q$. The rotary movement of the work-piece $o$ is derived from a motor $r$. The casing $a$ is fitted in a common frame $s$ which also carries the work-piece holder, and is adapted to be rocked horizontally about a guide $t$ into the pitch angle of the screw thread.

To secure the parts in position there serve bolts $u$ which engage guides in the casing $a$.

The invention is not limited to the embodiments described and illustrated. The construction and arrangement of the other bearing parts may be modified, as may also be other parts of the grinding machine without departure from the scope of the invention. Also there may be used multi-grooved grinding discs, or discs of other profiles. Also the form of the abutment face may be different. It is, however, important that the central plane of the profiled disc be co-planar with the axial stop.

What I claim is:

1. In a grinding machine embodying a rotatable spindle, bearings for supporting said spindle, a grinding disc carried by the spindle, a stop associated with the spindle to restrain axial movement thereof, located in the central plane of the grinding disc, and disc clamping flanges engaging the opposite sides of said grinding disc, said flanges being radially supported from points on said spindle disposed on opposite sides of said stop.

2. In a grinding machine embodying a rotatable spindle and a grinding disc secured thereon and normal thereto, radial bearings for supporting said spindle, said spindle being formed with an axial recess extending in from one end thereof and means extending into said recess carrying a thrust bearing engaging said spindle in the central plane of said grinding disc to restrain lateral movement of the disc during axial expansion or contraction of said spindle.

3. In a grinding machine, a supporting frame, a rotatable spindle carrying a grinding disc and journalled in radial bearings in said frame, said spindle having an axial opening formed therein, and means carried by said frame extending into the opening in said spindle and carrying a thrust bearing engaging said spindle in the central plane of said grinding disc.

4. In a grinding machine, a supporting frame, a rotatable spindle carrying a grinding disc and journaled in radial bearings in said frame, said spindle having an axial opening formed in one end thereof, means carried by said frame extending into said opening and carrying a thrust bearing engaging said spindle in the central plane of said grinding disc, a spring engaging the opposite end of the spindle and urging said spindle into engagement with said thrust bearing to restrain said grinding disc from lateral movement.

5. In a grinding machine, a supporting frame, a rotatable spindle carrying the grinding disc and journaled in radial bearings in said frame, said spindle having an axial opening formed therein, means carried by said frame extending into the opening in said spindle and carrying a thrust bearing engaging said spindle in the central plane of said grinding disc, said spindle being disposed vertically and adapted to rest on the thrust bearing under the action of its own weight.

ERICH BUCHHOLZ.